United States Patent [19]
White

[11] Patent Number: 5,708,120
[45] Date of Patent: Jan. 13, 1998

[54] GELLED REACTIVE RESIN COMPOSITIONS

[75] Inventor: Peter Drummond Boys White, Hereford, England

[73] Assignee: Ciba Specialty Chemicals Corporation, Tarrytown, N.Y.

[21] Appl. No.: 586,840

[22] PCT Filed: Jul. 27, 1994

[86] PCT No.: PCT/GB94/01614

§ 371 Date: Jan. 25, 1996

§ 102(e) Date: Jan. 25, 1996

[87] PCT Pub. No.: WO95/04095

PCT Pub. Date: Feb. 9, 1995

[30] Foreign Application Priority Data

Jul. 28, 1993 [GB] United Kingdom ............ 9315563

[51] Int. Cl.⁶ .................. C08G 59/00; C08G 65/08
[52] U.S. Cl. .................. 528/87; 528/93; 528/112; 528/113; 525/504; 525/523; 525/533
[58] Field of Search .............. 528/87, 93, 112, 528/113; 525/504, 523, 533

[56] References Cited

U.S. PATENT DOCUMENTS 3,538,039 11/1970 Lantz et al. ..................... 260/37
3,996,186 12/1976 Schreiber et al. ................. 525/523
5,214,098 5/1993 Setiabudi et al. ................. 525/526
5,312,651 5/1994 Takada et al. .................... 427/386
5,480,957 1/1996 Murio et al. ..................... 528/87

FOREIGN PATENT DOCUMENTS 1361909 7/1974 United Kingdom.

OTHER PUBLICATIONS

Lee et al, Handbook of Epox Resins, pp. 7–1 through 7–14, McGraw Hill, 1982.
Derw. Abst. 91–156893 [22] AFEP 429,894.

*Primary Examiner*—Randy Gulakowski
*Attorney, Agent, or Firm*—David R. Crichton

[57] ABSTRACT

The present invention relates to an epoxy composition that is isolated in the form of an infusible, gelled, heat curable, epoxy functional reaction product. The reaction product is formed by mixing together: (A) one or more epoxy resins or epoxy group containing compounds and (B) a hardener system which will react with (A) to give a gelled solid, but which does not cause complete curing of (A) under the reaction conditions chosen for reaction of (A) and (B) to give a gelled solid. The reaction product can be formed by including (C) an optional further hardener system for (A) and the reaction product of (A) and (B), which is different from (B), and which remains largely unreacted with (A) and (B) under said reaction conditions. The present invention further relates to a cured product of said epoxy composition.

14 Claims, No Drawings

GELLED REACTIVE RESIN COMPOSITIONS

This invention relates to gelled, uncured epoxy resin based compositions. That is compositions where the reactive ingredients they have been made from have reacted to at least the level where they can no longer be effectively melted but contain some unreacted epoxy groups and hardener groups to react further.

The invention is concerned with the compositions themselves, the method of making them and their use when cured alone or in contact with other reactive resin systems particularly epoxy resins, but also with polyester, acrylic and isocyanate based materials.

Little attention has been given to gelled uncured epoxy resin compositions in the past as the lack of flow under heat and relatively poor mechanical properties have made them unsuitable for most standard processing methods and end use requirements.

Surprisingly we have found that these compositions have advantages in respect of (a) their inability to melt and wet surfaces they are in contact with, (b) their ability to be ground, pulverised, cut or powdered more easily compared to their fully cured counterparts, (c) their ability to be shaped and then be heat cured to full reaction, without flowing, (d) their ability to react at or near their outer surfaces with other reactive materials, giving strong and chemical resistant bona, and (e) their ability to be further cured by heating without sintering together.

This combination of features allows the easy manufacture of gelled compositions and cured products with a wide range of interesting properties that can be usefully employed in a variety of ways.

The gelled compositions provided by this invention are made by reacting, or allowing to react, epoxy resins with hardeners until they have reached the gel or non flowing stage and stopping the reaction or allowing it to stop itself. Stopping the reaction is usually achieved by lowering the temperature to the point where the reaction slows greatly or when the resin and hardener system itself reacts to the point where it is solid enough to be slowed greatly or when them are two or more hardener systems present some of which react to give a gel and the remainder do not react much until heated further.

Usually the resins and hardeners are mixed together and reacted or allowed to react in containers which if the correct conditions are selected will result in gelled, non fully cured masses. The gelled materials provided by this invention may be physically changed in shape by warming them to above their softening temperature and applying a mechanical load. Depending on the actual composition selected the temperature needed to do this forming will usually be much lower than if the composition was fully cured, and this temperature differential can be as high as 200° C.

If the heated changed shape is cooled under constraint it will maintain this shape until warmed unconstrained near to its softening temperature when the original shape will be largely restored. The ability to do this applies to some extent to most thermoset materials, but this invention provides a major difference in that, provided the hardener system has been carefully selected, continued heating after thermal forming will result in full cure occuring in the new shape which then becomes permanent despite unconstrained heating close to the softening temperature.

As the compositions are already gelled before forming they will not melt and stick to the surfaces in contact with them during this forming operation and for the same reason can be cut, sawn, drilled and machined both before or after final curing without wetting or in general sticking to the tools. They may also be produced in any form by pregelation treatment and then gelled. Ungelled, gellable compositions of this invention may either be allowed to gel at room temperature or heated to achieve gelation at temperatures which do not significantly initiate the reaction of the optional hardener system (c) as hereinafter described.

Heat curable, gelled, resin compositions of the present invention may be broken, cut, ground, or powdered after gelation. If after the selected reaction gelation has not taken place but the reaction product has become of high enough melting point to be powdered without sintering them this method can be used to make gelled particles provided they can be gelled as powders at ambient or elevated temperatures without remelting into a solid mass.

Powdering is usually easier before gelation has been reached, but after gelation is still much easier than with the equivalent fully cured compositions. In the case of ungelled powders, where sintering may occur, it is often relatively easy to regrind or powder the sintered material.

Gelled compositions of this invention may then be used in the uncured state or heat cured if required. Thus it may be seen these compositions possess very interesting and useful properties for making cured shapes with unusual convenience, for instance in architectural features, decorative furniture, or sculpture, from the compositions presented in the form of sheets, rods, and other profiles. Powders and particles of this type can find many applications for instance as blasting media for removing paint or cleaning sensitive surfaces such as carbon composites, in artificial jewellery, general decorative materials, or as modifiers of other curable resin systems including the ability to provide multitexture and multicolour products.

It is clear that many additives could be used in these curable compositions to modify the ungelled, gelled and cured properties. Where the uncured gelled compositions are contacted by other curable resin systems, such as epoxies or isocyanate functional materials for instance, there exists significant potential for reaction between the two, both at the surface of the gelled uncured material and close to it where the uncured resin system is capable of molecular penetration. Unsaturated groups such as maleic, acrylic or methacrylic groups can be built into the structure to allow similar reaction with polyester resins and acrylic systems. Where such reaction takes place chemical bonds will be formed across the interface permitting better adhesion and chemical resistance. This type of reaction will allow effective modification of the subsequently cured resin with the gelled uncured material when both have been cured in contact together.

Where the gelled compositions are precured and then contacted by other curable resin systems such as epoxies, polyesters, acrylic or isocyanate functional materials there still exists potential for reaction between the two although this is somewhat reduced as the concentration of reactive groups will be reduced, nevertheless the final completely cured combinations are still of considerable value.

The present invention provides an epoxy composition which is an infusible, gelled, heat-curable, epoxy functional reaction product formed by mixing together (A) one or more epoxy resins or epoxy group containing compounds (B) a hardener system which will react with (A) to give a gelled solid, but which will not cause complete curing of (A) under the reaction conditions chosen for (A) and (B)

(C) an optional further hardener system for (A) and the reaction product of (A) and (B), which is different from (B), and which remains largely unreacted under the conditions of reaction chosen for (A) and (B) with (A) and (B)

(D) optionally, other additives that may be required to modify the physical properties of the cured or uncured compositions.

The gellable epoxy resin composition is made by blending (A), (B), (C) and (D) together by any convenient method, but in such a way that at least (A) and (B) become homogeneous. The reaction between (A) and (B) may be carried out at any suitable temperature and condition provided that neither it, nor the exothermic heat generated from it causes full cure alone or causes (C), if employed, to substantially effect full cure whilst it is taking place.

The epoxy resins or epoxy group containing compounds, (A), employed in this invention may be glycidyl ethers, glycidyl mines, glycidyl esters or cycloaliphatic compounds, or combinations of these including halogenated and unsaturated versions where these are required. Preferred epoxy resins and blends are those which are suitable liquids for ready mixing with the other ingredients at suitable temperatures which will usually be below 150° C. Epoxy resins or epoxy containing compounds or blends of them which are liquid at room temperatures are the most convenient. One class of hardener system, (B), used to convert the liquid resins to a gelled solid is a compound or mixtures of compounds whose most reactive groups relative to the epoxy materials employed are amines and in general primary or secondary amines.

Acids and acid anhydrides are also good hardener systems, (B), but usually need other materials present such as tertiary mines, polyols and copper salts, etc., to increase their rate of reaction. Where these additives do not severely shorten the uncured life of the gelled systems or interfere with the hardener system (C) if employed they are a valuable part of this invention.

The hardener systems may be aromatic, cycloaliphatic, heterocyclic, or aliphatic or in any combination and are usually and mostly difunctional and/or polyfunctional with respect to the epoxy compounds, (A).

The hardener system (B) may contain a variety of other groups and the total combined reaction of all the groups reactive with epoxy groups must be enough to enable the gelation of (A) under the conditions of reaction selected and to substantially cure (A) under the curing conditions if optional hardener (C) is not used. The incorporation of unsaturated groups such as maleic acid, anhydride, acrylic acid and their derivatives provides reaction sites for polyester and acrylic resin type systems.

The optional hardener systems, (C), if employed, for the epoxy compounds (A) and the reaction products between (A) and (B) can be selected from a wide variety of those well known in epoxy chemistry. Typical, but not exclusive examples of useful optional hardener systems are dicyandiamide, aromatic amines such as diaminodiphenyl sulphones, boron trifluoride amine complexes, imidazoles, carboxylic acids, hydrazides and substituted ureas. For greatest uncured stability a requirement of the optional hardener system is that it should not substantially react whilst (A) and (B) are being reacted to form a gelled or gellable solid. There may be one or several hardeners used together in either (B) or (C), some of which may accelerate the curing rates of the others.

Other additives (D), which can be used to modify the physical properties of the gellable, gelled or cured compositions include but are not limited to thixotropes, toughening agents, wetting agents, surfactants, fibrous materials, dyes, pigments, fillers, flame retardants, smoke suppressants, expanding agents, hollow microspheres, flow assisting materials, fusible glasses, stabilisers, lubricants such as molybdenum disulphide or polytetrafluoroethylene and abrasives such as silicon carbide, diamond, alumina or sand.

The reaction mixture, (A), (B), (C) and (D) may be cast into any required shape such as sheets, blocks, rods and pellets and depending on the composition used, the mixing temperatures, the size and shape of the casting and any reaction exotherm generated, may or may not gel. Where gelation does not take place in a convenient time but is required this may usually be achieved by heating the mixture at temperatures and times low enough to avoid the full curing action of (B) or of (C), if employed, Ungelled liquid or solid compositions used to make the compositions of this invention may be gelled or cured in contact with liquid media including epoxy resins, polyester resins, acrylic resins and isocyanate reactive resins as well as inert liquids and hot gases. This invention offers a new, simple, clean route to form and make epoxy articles through the use of incompletely reacted, heat curable, gelled, epoxy compositions.

The simplicity, is attributable to the ease with which the compositions can be formed by bending or broken up by impact, cutting, grinding and powdering, etc., compared to the fully cured equivalent compositions.

The lower temperatures to carry out these operations are permitted by forming before full cure and maximum glass transition temperature have been reached.

The cleanliness of forming, grinding or powdering is the result of the composition being gelled and hence unable to melt and contaminate the surfaces it is in contact with.

Thermoset permanency in the final shape can be achieved by fully curing the composition by heating in the desired configuration.

These shapes or particles may then be used cured or just gelled, by themselves, in conjunction with other materials, or as part of another curable resin system to satisfy a wide range of practical needs.

The invention is illustrated by the following Examples in which Examples 2(a) and 2(b) are for comparison purposes.

EXAMPLE 1

The following mixture was produced:

| | |
|---|---|
| EPIKOTE 828 | 100.0 parts by weight |
| 33'dimethyl 44'diaminodicyclohexyl methane | 18.0 parts by weight |
| green dye | trace |

The ingredients were thoroughly dispersed and then treated in the following ways: (a) Poured into a released tray 0.5 cm deep, covered with polythene and stood for 7 days at 25° C. The mixture had become a brittle solid which was easily broken up. It had a Kofler Heat Bank melting point of around 57° C. On a hot plate at 180° C. the mix melted but gelled within 1–2 minutes. On storing for 14 days as a powder this mix showed little signs of sintering.

(b) A sample of the powdered composition in (a) was sieved to give particles in the range of 500–1000 microns. 10 grams of this powder was dispersed in 100 grams of EPIKOTE 828 and the mixture heated with periodic stirring to 60° C. and kept at 60° C. for 2 hours. There was no evidence of the powder dissolving and the resin showed no green colouration.

The temperature of this blend was increased to 120° C. with no signs of solution of the powder or colouration of the resin.

The temperature was then increased to 180° C. again with no signs of the solution of the powder or colouration of the resin.

This example illustrates the possibility of gelling a powdered resin with a Kofler Heat Bank melting point of 57° C. in a liquid epoxy resin without significant solution of the powder during the process.

(c) A mixture was prepared and stored as in (a) above, but at the end of this period was heated for 2 hours at 60° C. On cooling the mixture was a brittle solid and a little less easy to break up than the sample in (a). The powdered product now had no Kofler Heat Bank melting point and was gelled. The powdered product showed no signs of sintering on storage for 14 days and no signs of dissolving on stirring in epoxy resin at 120° C.

(d) A sheet of resin 2 mm thick produced as in (c) above was heated to 150° C. At this temperature it was easily formable to different shapes. If held in these shapes whilst cooling to workshop temperature the shapes remained basically unchanged when the restraint was removed. When such shapes were reheated unconstrained to 150° C. they quickly reverted to the initial flat form.

This example illustrates the ability to form and retain such forms easily with these materials. It also shows that they will naturally return to their original shape on heating when there is no other hardener present to react with the unreacted part of the epoxy resin present.

EXAMPLE 2

The following mixture was produced:

| EPIKOTE 828 | 100.0 parts by weight |
|---|---|
| 33'dimethyl 44'diaminodicyclohexyl methane | 15.0 parts by weight |
| green dye | trace |

The ingredients were thoroughly dispersed and then treated in the following way:

(a) Poured into released tray 0.5 cm deep, covered with polythene and stored for 7 days at 25° C. The mixture had become a brittle solid which was easily broken up. It had a Kofler Heat Bank melting point of around 52° C. On a hot plate at 180° C. the mix melted and formed a very soft flexible gel over a period of 2–20 minutes. On storing for 14 days as a powder this mix showed some tendency to sinter.

(b) A sample of the powdered composition in (a) was sieved to give particles in the range of 500–1000 microns. 10 grams of this powder was dispersed in 100 grams of EPIKOTE 828 and the mixture heated with periodic stirring to 60° C. and kept at 60° C. for 2 hours. There was no evidence of the powder dissolving and the resin showed no green colouration. The temperature of this blend was then increased to 120° C., when the majority of the particles dissolved in the resin giving a uniform green colouration showing that the particles were not gelled.

This example shows the need when using this invention to assess the conditions of reaction and use carefully in relation to the composition employed. This composition treated in this way would be suitable as intended for modifying epoxy resin compositions at 60° C. but not at 120° C.

(c) A mixture was prepared and stored as in (a) above, but at the end of this period was heated for 2 hours at 120° C. On cooling the mixture was a brittle solid and a little less easy to break up than the sample in (a). The powdered product now had no Kofler Heat Bank melting point and was gelled. The powdered product showed no signs of sintering on storage for 14 days and showed no signs of dissolving on stirring in epoxy resin at 120° C. or 180° C.

The example shows that the same composition as used in (b) above is rendered insoluble and gelled by more extensive heat treatment and is thus suitable for use in epoxy resin modification according to this invention.

(d) A sheet of resin 2 mm thick produced as in (c) above was heated to 120° C. At this temperature it was easily formed into different shapes and behaved in the same way as the sample in Example 1 (d) except lower temperatures could be employed for forming.

EXAMPLE 3

The following mixture was produced:

| EPIKOTE 828 | 100.0 parts by weight |
|---|---|
| maleic acid | 10.0 parts by weight |
| carbon black | trace |

The ingredients were stirred together and heated to 150° C. The maleic acid dissolved and reacted with the resin over 2 hours. Then 60.0 parts by weight of phthalic anhydride were added with rapid stirring and the temperature dropped quickly to 80° C. The heating was continued until the mix just gelled and was then quickly cooled to more temperature.

The solid gelled mix was then easily broken up into pieces and contained unreacted epoxy, anhydride, acid and unsaturated groups.

The broken gelled resin was sieved to give particles in the range of 500–1000 microns. 10 grams of this powder were mixed into a resin blend made up of:

| EPIKOTE 828 | 100.0 parts by weight |
|---|---|
| 33'dimethyl 44'daminodicyclohexyl methane | 34.0 parts by weight |
| Aerosil filler | 3.0 parts by weight |

This was poured into a mould and cured for 2 hours at 60° C. and 2 hours at 120° C. The black particles did not dissolve but gave a uniform yellow transparent resin with evenly dispersed black particles in it. The fully hardened product was very strong.

EXAMPLE 4

10 grams of the gelled powder made in Example 3 were mixed into a resin blend:

| Crystic - unsaturated polyester resin | 100.0 parts by weight |
|---|---|
| Peroxide catalyst | 2.0 parts by weight |
| Accelerator | 1.0 parts by weight |
| Aerosil filler | 3.0 parts by weight |

This was poured into a shallow tray and after an hour gave a solid yellow casting with black particles evenly dispersed in it. The particles had not dissolved and the cast product that had shrunk quite a lot was very strong.

This is an example showing epoxy particles with unsaturated groups used in an unsaturated resin. The results are very good.

EXAMPLE 5

The following mixture was produced:

| | |
|---|---|
| EPIKOTE 828 | 100.0 parts by weight |
| 44'diaminodiphenyl methane (MDA) | 28.0 parts by weight |
| Blue dye | trace |

The MDA was melted, the resin added gently with rapid stirring until a clear liquid was made. This was cooled rapidly to 22° C. After 6 days the mixture was a brittle solid which was easily broken up. It had a Kofler Heat Bank softening point of around 66° C. On a hot plate at 180° C. the mix melted but gelled very rapidly. On storing the powder showed little signs of sintering but after 1 month no longer melted on the Kofler Heat Bank and was gelled.

The broken gelled resin was sieved to give particles in the range of 500–1000 microns. 10 grams of this powder were mixed into a resin blend made up of:

| | |
|---|---|
| EPIKOTE 828 | 100.0 parts by weight |
| 33'dimethyl 44'diaminodicyclohexyl methane | 34.0 parts by weight |
| Aerosil filler | 3.0 parts by weight |

Two tests were run, one with the powder 6 days old and one 30 days old. The mixtures were poured into a mould and cured for 2 hours at 60° C. and 2 hours at 120° C. The blue particles did not dissolve in either case although one was gelled and the other was not. This example shows that a powder can be made which goes from ungelled to gelled state on its own at shop temperatures. In the first case the powder gelled in contact with the resin without dissolving, in the second case the powder could not dissolve. Both castings were very strong.

The initial mixture was cured for 60 minutes at 100° C and 60 minutes at 180° C. and had a Tg in the region of 155° C. and so showed that this invention may be achieved by the use of only one hardener or system without the use of the optional hardener system.

EXAMPLE 6

A liquid Bisphenol A epoxy resin (EPIKOTE 828—SHELL CHEMICAL CO.) with an epoxy content of approximately 5.3 gram equivalents of epoxy oxygen per kilogramme was mixed with 44' diaminodiphenyl methane and finely powdered dicyandiamide, together with a thoroughly milled 10% w/w carbon black dispersion in the liquid resin.

The composition employed was:

| | |
|---|---|
| EPIKOTE 828 | 100.0 parts by weight |
| 44'diamino diphenyl methane | 15.0 parts by weight |
| dicyandiamide | 5.0 parts by weight |
| black paste | 1.0 parts by weight |

The mixture was thoroughly stirred whilst being heated to 100° C. and as soon as the amine had dissolved it was poured into a released tray 0.5 cms deep. Heating was continued for 3 hours at 100° when the mixture was a relatively soft gelled product.

A small piece cut off the gelled mass was placed on a hot plate at 180° C., it showed no signs of melting but after curing for 1 hour at this temperature was much harder. This cured sample possessed a Tg of around 135° C.

The remainder of the glossy black sheet was removed from the tray at 100° C. and wrapped around a 10 cm diameter mandrel and was held in position with a metal band. The assembly was placed in an oven at 180° C. for 1 hour, and then removed. When the metal band was taken off hot the sheet retained the basic curvature of the mandrel and on cooling to room temperature was a strong, tough product of essentially the same shape. Niether the metal band nor the mandrel were precleaned or released but there was no flow of the sheet composition onto either.

A similar flat sheet cured for 1 hour at 180° C. could not easily be formed around the mandrel at 250° C.

EXAMPLE 7

The following mixture was produced:

| | |
|---|---|
| EPIKOTE 828 | 50.0 parts by weight |
| Bisphenol F resin (epoxy content approximately 5.5 gram equivalents per kilogramme) | 50.0 parts by weight |
| Propylene glycol diamine (D230 ex TEXACO) | 17.0 parts by weight |
| Curol C172 (ex AIR PRODUCTS) | 3.0 parts by weight |
| Soluble blue dye | |

The mixture was poured into a released tray to a depth of 2 millimeters and allowed to react for 10 hours at 22° C. The temperature was then raised to 60° C. for two hours when a blue flexible sheet was obtained. A small section was removed and put on a hot plate at 120° C. where it showed no signs of melting and appeared to be gelled. After a further hour at 120° this sample appeared flexible but firm and tough.

The original sheet was heated to 120° C. and easily moulded around a 5 cm mandrel and when in this position was heated for a further 1 hour at 120° C. After this time the sheet became more rigid and on release maintained shape effectively on cooling to 22° C., where it was a very tough clear blue plastic moulding.

A further sheet was prepared according to this example and after heating for 2 hours at 60° C. was cooled to 22°. It was relatively rigid at this temperature. A 1 centimeter steel bar, heated to 120° was placed across the sheet and after a few seconds it was possible to bend the sheet around the mandrel by moving the cold ends. The sheet folded easily around the hot bar to form a 90° section with a 1 centimeter diameter curve. On cooling the bent section in this position the sheet stayed as bent. On placing the section in an oven unrestrained at 120° C. the sheet rapidly returned to the initial flat conditions. If restrained to shape in the oven at 120° C. for 1 hour the sheet essentially retained its new shape whether restrained or not.

I claim:

1. An epoxy composition which is isolated in the form of an infusible, gelled, heat curable, epoxy functional reaction product formed by mixing together:

(A) one or more epoxy resins or epoxy group containing compounds;

(B) a hardener system which will react with (A) to give a gelled solid, but which does not cause complete curing of (A) under the reaction conditions chosen for reaction of (A) and (B) to give a gelled solid; and (C) an optional further hardener system for (A) and the reaction product of (A) and (B), which is different from (B), and which remains largely unreacted with (A) and (B) under said reaction conditions.

2. A composition according to claim 1 wherein at least a majority of the epoxy resins or epoxy group containing compounds contain epoxy groups selected from glycidyl ether, glycidyl amine, glycidyl ester, cycloaliphatic epoxide, halogenated epoxide, unsaturated epoxides and mixtures thereof.

3. A composition according to claim 1 where the hardener system (B) is an amine.

4. A composition according to claim 1 or 2 where the hardener system (B) is an anhydride and/or carboxylic acid together with any reaction accelerators.

5. A composition according to claim 1 where the optional hardener system (C) includes dicyandiamide, an aromatic amine, a boron trifluoride amine complex, an imidazole, a carboxylic acid, a hydrazide or a urea.

6. A composition according to claim 1 in which component (A) contains unsaturated groups.

7. A composition according to claim 6 where unsaturated groups are acrylic, methacrylic or maleic in type.

8. A composition according to claim 1 which contains an additional material to modify the physical properties of the gelled or cured products selected from thixotropes, toughening agents, wetting agents, surfactants, fibrous materials, fillers, flame retardants, smoke suppressants, expanding agents, hollow microspheres, flow assisting materials, fusible glasses, stabilizers, lubricants and abrasives.

9. A composition according to claim 8 which contains a further additional material that modifies the color, appearance, cosmetics or aesthetics of the gelled or cured products selected from pigments and dyes.

10. A composition according to claim 1 in the form of particles, pellets, granules or powders at normal workshop temperatures.

11. A composition according to claim 1 which is cured by heating.

12. A composition according to claim 1 wherein the optional hardener system (C) is a diaminophenyl sulphone.

13. A composition according to claim 1 comprising the further hardener system for (A).

14. A composition according to claim 6 comprising the further hardener system for (A).

* * * * *